US006215519B1

(12) United States Patent
Nayar et al.

(10) Patent No.: US 6,215,519 B1
(45) Date of Patent: Apr. 10, 2001

(54) COMBINED WIDE ANGLE AND NARROW ANGLE IMAGING SYSTEM AND METHOD FOR SURVEILLANCE AND MONITORING

(75) Inventors: Shree K. Nayar; Rahul Swaminathan, both of New York; Joshua M. Gluckman, Brooklyn, all of NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/034,745

(22) Filed: Mar. 4, 1998

(51) Int. Cl.[7] .............................. H04N 7/18; H04N 9/47

(52) U.S. Cl. ........................................... 348/159; 348/148

(58) Field of Search .................................. 348/143, 153, 348/154, 159, 169, 705, 148; H04N 7/18, 9/47

(56) References Cited

U.S. PATENT DOCUMENTS

| Re. 34,989 | 7/1995 | Struhs et al. ........................ 348/151 |
|---|---|---|
| 3,505,465 | 4/1970 | Rees .......................................... 178/6 |
| 4,326,218 | 4/1982 | Coutta et al. ........................ 358/108 |
| 4,549,208 | 10/1985 | Kamejima et al. .................. 358/108 |
| 4,992,866 | * 2/1991 | Morgan ................................ 348/159 |
| 5,164,827 | 11/1992 | Paff ....................................... 358/108 |
| 5,185,667 | 2/1993 | Zimmermann ...................... 358/209 |
| 5,212,547 | * 5/1993 | Otsuki .................................. 348/139 |
| 5,311,305 | 5/1994 | Mahadevan et al. ................ 348/169 |
| 5,313,306 | 5/1994 | Kuban et al. .......................... 348/65 |
| 5,359,363 | 10/1994 | Kuban et al. .......................... 348/36 |
| 5,365,597 | * 11/1994 | Holeva .................................... 382/8 |
| 5,384,588 | 1/1995 | Martin et al. .......................... 348/15 |
| 5,394,209 | 2/1995 | Stiepel et al. .......................... 354/81 |
| 5,434,617 | * 7/1995 | Bianchi ................................ 348/170 |
| 5,530,650 | 6/1996 | Biferno et al. ...................... 364/460 |
| 5,539,483 | 7/1996 | Nalwa ..................................... 353/94 |
| 5,563,650 | 10/1996 | Poelstra ................................. 348/36 |
| 5,589,901 | 12/1996 | Means ................................... 396/12 |
| 5,610,391 | 3/1997 | Ringlien .......................... 250/223 B |
| 5,627,616 | 5/1997 | Sergeant et al. ...................... 354/81 |
| 5,654,750 | * 8/1997 | Weil et al. .......................... 348/143 |

OTHER PUBLICATIONS

Merriam–Webster, "Merrian Webster Collegiate Dictionary", 10th edition, 1997.*

(List continued on next page.)

Primary Examiner—Howard Britton
Assistant Examiner—Nhon T Diep
(74) Attorney, Agent, or Firm—Baker Botts L.L.P.

(57) ABSTRACT

A surveillance and monitoring system and method for monitoring an area which includes a first imaging system having a wide-angle field of view approximately equal to or greater than the area. The system also includes one or more second imaging systems having adjustable view settings, each of one or more second imaging systems being positioned to view portions of the area and being capable of producing images of the portions with a resolution greater than the first imaging system. The system also includes one or more controls for controlling the adjustable view settings of the one or more second imaging systems so as to obtain high-resolution, magnified images of regions of interest within the area being monitored. The adjustable view settings may include pan, tilt, and zoom settings for adjusting the panning, tilting, and zooming of one or more second imaging systems with respect to the monitored area. In the method, a global image of the area being monitored is sensed with a first imaging system having a field of view approximately equal to or greater than the area, a region of interest is detected within the global image, and one or more detailed images of the region of interest with at least one of one or more second imaging systems are sensed. At least one of the detailed images may have a higher resolution than that of the global image.

28 Claims, 13 Drawing Sheets

Microfiche Appendix Included
(1 Microfiche, 98 Pages)

OTHER PUBLICATIONS

"Primary Image–Press Releases," http://www.primary-image.com/frames/pressrel/index.html, Last updated Apr.13, 1998.

"Primary Image–Zoom–In For New Products, " www.primary-image.com/frames/pressrel/ptz.html, Sept. 1997.

"Primary Image–Video Tracker Pan–Tilt–Zoom Control," http://www.primary-image.com/frames/vt_ptz.html, Last updated Oct. 5, 1997.

"Primary Image–Video Tracker (aka Action Tracker)," http://www.primary-image.com/frames/vt_top.thml, Last updated Apr. 7, 1998.

"Primary Image–Video Tracker Rack Mount System," http://www.primary-image.com./frames/vt_mount.html, Last updated Apr. 7, 1998.

"Primary Image–Zome Masking Option," http://www.primary-image.com./frames/vt_mask.html, Last updated Apr. 7, 1998.

"Primary Image–Video Tracker Pan–Tilt–Zoom Control," http://www.primary-image.com./frames/vt_ptz.html, Last updated April 7, 1998.

"Primary Image–Video Tracker Frequently Asked Questions," http://www.primary-image.com./frames/vt_qna.html, Last updated April 7, 1998.

"Primary Image–Video Tracker Technical Specifications," http://www.primary-image.com./frames/vt_tech.html, pp. 1–2, Last updated April 7, 1998.

"Primary Image–$2^{nd}$ Eyes,"http://www.primary-image.com./frames/2e_top.html, Last updated April 7, 1998.

"Primary Image–$2^{nd}$ Eyes Applications," http://www.primary-image.com./frames/2e_appl.html, pp. 1–2, Last updated April 7, 1998.

"Primary Image–$2^{nd}$ Eyes Questions and Answers," http://www.primary-image.com./frames/2e_qna.html, Last updated Apr. 7, 1998.

"Primary Image–$2^{nd}$ Eyes Technical Specifications," http://www.primary0image.com./frames/2e_tech.html, pp. 1–3, Last updated April 7, 1998.

"Mitsubishi Electric America–Omnidirectional Vision System," http://www.mitsubshi.com/mea/future/omni/(earliest download date –Feb. 19, 1998).

"Mitsubishi Electric America–Product Highlight,"http://www.mitsubshi.com/mea/future/omni/omnipr.html (earliest download date –Feb. 19, 1998).

Shree K. Nayar et al., "Omnidirectional VSAM Systems: PI Report," Proceeding of DARPA, Image Understanding Workshop, New Orleans, pp. 55–61, May 1997.

Primary Image, "PTZ Camera AutoSteering With Action Tracker," pp.1–2.

Jo Baglow, "Covert Surveillance,"Security Technology & Design, pp. 58–59, Dec. 1997.

Shree K. Nayar, "Omnidirectional Video Camera," Proc. of DARPA Image Understanding Workshop, New Orleans, May 1997.

Shree Nayar et al., "Catadioptric Image Formation, " Proc. of DARPA Image Understanding Workshop, New Orleans, May 1997.

S. Bogner, "Introduction to Panospheric Imaging", Proceedings of the 1995 IEEE International Conference on Systems, Man and Cybernetics, pp. 3099–3106 (1995).

S. Bogner, "Application of Panospheric Imaging to an Armored Vehicle Viewing System", Proceedings of the 1995 IEEE International Conference on Systems, Man and Cybernetics, pp. 3113–3116 (1995).

S. Bogner et al., "The Impact of Panospheric Imaging on Cockpit Displays, "SPIE's 11th Annual Symposium on Aerospace/Defence Sensing, Simulation, and Controls, pp. 1–11, April 1997.

J. Murphy, "Application of Panospheric Imaging to a Teleoperated Lunar Rover", Proceedings of the 1995 IEEE International Conference on Systems, Man and Cybernetics, pp. 3117–3121 (1995).

E. Hall et al., "Omnidirectional Viewing Using a Fish Eye Lens," SPIE –Optics, Illimination, and Image Sensing for Machine Vision, Vol. 728, pp. 250–256 (1986).

S. Zimmermann et al., "A Video Pan/Tilt/Magnify/Rotate System with no Moving Parts," Proceedings of 1992 IEEE.AIAA 11th Digital Avionics Systems Conference, pp. 523–31 (IEEE, 1992).

V. Nalva, "A True Omni–Directional Viewer,"Bell Laboratories Technical Memorandum, BL0115500–960115–01 (Jan. 1996).

S.E. Chen, "Quick Time ® VR–An Image–Based Approach to Virtual Envbironment Navigation,"Proceedings of SIGGRAPH 1995, Los Angeles, CA, August 6–11, 1995.

Leonard McMillan and Gary Bishop, "Plenoptic Modeling: an Image–Based Rendering System,"Proceedings of SIGGRAPH 1995, Los Angeles, CA, August 6–11, 1995.

K. Yamazawa et al., "Obstacle Detection with Omnidirectional Image Sensor HyperOmni Vision," Proceedings of 1995 IEEE Internation Conference on Robotics and Automation, Vol. 1, pp. 1062–7 (IEEE 1995).

Y. Yagi et al., "Evaluating Effectivity of Map Generation by Tracking Vertical Edges in Omnidirectional Image Sequence," Proceedings of 1995 IEEE International Conference on Robotics and Automation, Vol. 3, pp. 2334–9 (IEEE 1995).

Y. Yagi et al., "Map–based Navigation for a Mobile Robot with Omnidirectional Image Sensor COPIS," IEEE Transactions on Robotics and Automation, Vol. 11, No. 5, pp. 634–48 (IEEE Oct. 1995).

* cited by examiner

COMBINED WIDE ANGLE AND NARROW ANGLE IMAGING SYSTEM AND METHOD FOR SURVEILLANCE AND MONITORING

MICROFICHE APPENDIX

A microfiche appendix of a computer program for performing the techniques in accordance with the invention is attached to this document. There is a total of one microfiche having 98 frames as part of the appendix.

BACKGROUND OF THE INVENTION

1. Field of the Invention

This invention relates to a system and method for monitoring and surveillance, and particularly to a system and method employing both wide-angle and narrow-angle imaging optics.

2. Discussion of the State of the Art

Traditionally, surveillance and monitoring ("SAM") systems have used off-the-shelf lenses and cameras for imaging. Because of the limitations of lenses, these systems typically provide very limited fields of view. To increase their limited fields of view, traditional SAM systems have relied on panning and tilting of the imaging system. As defined in this specification and the appended claims, "panning" refers to movement in a plane substantially horizontal to the area being monitored, and "tilting" refers to movement in a plane substantially vertical to the area being monitored. Typically, when a pan-and-tilt system is used, the system scans an area in some predefined or random path until an object of interest is detected. At that point, the object may be tracked by the system for further observation. Typically, such a system may also include a zoom lens for zooming in on objects of interest. Such systems are usually characterized as pan, tilt, and zoom ("PTZ") systems. Another approach to SAM systems has been the use of multiple PTZ systems to cover an area being monitored. Examples of PTZ systems are described in U.S. Pat. No. 5,627,616 to Sargeant et al.; U.S. Pat. No. 5,394,209 to Stiepel et al.; U.S. Pat. No. 5,164,827 to Paff; and U.S. Reissue Pat. No. 34,989 to Struhs et al., which are incorporated herein by reference.

While PTZ systems enlarge the field of view capable of being monitored by a lens-and-camera system, their scanning time makes them unsuitable for many real-time applications - - - i.e., fast-moving objects may enter and leave the area being monitored before the PTZ systems are able to detect them. Additionally, if a PTZ system uses a predefined scanning path, the monitoring performed by the system could be circumvented. That is, if an intruder is aware of the predefined scanning path, the intruder may be able to move about the monitored area without being detected by the PTZ system.

Another approach to SAM systems has been the use of wide-angle or so-called "omnidirectional" imaging systems. For example, the use of "fish-eye" lens for wide-angle viewing is disclosed in E. L. Hall et al., "Omnidirectional Viewing Using a Fish Eye Lens", SPIE Vol. 728 Optics, Illumination, and Image Sensing for Machine Vision (1986), p. 250, and U.S. Pat. No. 5,185,667 to Zimmerman, which is incorporated herein by reference. Since the fish-eye lens has a very short focal length, the field of view may be as large as or sometimes greater than a hemisphere.

Other prior art devices have used reflecting surfaces to increase the field of view. One such prior art device is disclosed in V.S. Nalwa, "A True Omni-Directional Viewer", AT&T Bell Laboratories Technical Memorandum, BL0115500-960115-01, January 1996. Nalwa discloses the use of multiple planar reflecting surfaces in conjunction with multiple charge-coupled device ("CCD") cameras to obtain a 360 degree panoramic image of a 50 degree band of a hemispherical scene. Specifically, in Nalwa, four planar mirrors are arranged in the shape of a pyramid, with one camera being positioned above each of the four planar reflecting sides, and with each camera viewing slightly more than 90 degrees by 50 degrees of the hemispherical scene. A similar device is disclosed in U.S. Pat. No. 5,539,483 to Nalwa, which is incorporated herein by reference.

Both Yagi et al., "Evaluating Effectivity of Map Generation by Tracking Vertical Edges in Omnidirectional Image Sequence", IEEE International Conference on Robotics and Automation, June 1995, p. 2334, and Yagi et al., "Map-Based Navigation for a Mobile Robot With Omnidirectional Image Sensor COPIS", IEEE Transactions on Robotics and Automation, Vol. II, No. 5, October 1995, disclose a conical projection image sensor (COPIS) which uses a conical reflecting surface to gather images from the surrounding environment and processes the information to guide the navigation of a mobile robot.

Yamazawa et al., "Obstacle Detection With Omnidirectional Image Sensor HyperOmni Vision", IEEE International Conference on Robotics and Automation, October 1995, p. 1062, discloses a purported improvement to the COPIS system which involves the use of a hyperboloidal reflecting surface in place of a conical surface. Prior to Yamazawa et al., U.S. Pat. No. 3,505,465 to Donald Rees also disclosed the use of a hyperboloidal reflecting surface to achieve panoramic viewing. Rees is incorporated herein by reference.

As compared to traditional PTZ systems, the wide-angle or omnidirectional prior art devices described above have certain disadvantages. For example, the wide-angle or omnidirectional devices typically provide image resolution that is relatively low as compared to traditional PTZ systems. This is because, to avoid costly special designs, the wide-angle or omnidirectional devices typically utilize off-the-shelf cameras whose resolution is adequate for smaller fields of view. In addition, a lower resolution is often necessary if real-time video images are desired from the wide-angle or omnidirectional devices because real-time, high resolution video images of a wide field of view require a great amount of throughput on the part of image processing equipment connected to the wide-angle or omnidirectional devices. Moreover, a further drawback of wide-angle or omnidirectional devices as compared to traditional PTZ systems is that zooming in on a region of interest by image processing of a wide-angle or omnidirectional image cannot provide better resolution of the region of interest than in the original wide-angle or omnidirectional image, whereas zooming in on a region of interest with a zoom lens of a traditional PTZ system can provide higher resolution of the region of interest than in the original image.

Accordingly, there exists a need for a cost-effective SAM system that provides both a wide-angle field of view of an area being monitored in combination with the capability for high-resolution images of regions of interest within the monitored area.

SUMMARY OF THE INVENTION

The primary objective of the present invention is to provide a surveillance and monitoring system and method that provides both a wide-angle field of view of an area being monitored as well as the capability for high-resolution, magnified images of regions of interest within the monitored area. Other objectives will become apparent to those skilled in the art as they read the specification herein.

To overcome the drawbacks of the prior art, a surveillance and monitoring system according to the present invention includes a first imaging system having a wide-angle field of view approximately equal to or greater than the area being monitored. The system also includes one or more second imaging systems having adjustable view settings, each of the second imaging systems positioned to view portions of the area and being capable of producing images of the portions with a greater resolution than the first imaging system. The system also includes one or more controls for controlling the adjustable view settings of the one or more second imaging systems.

In use, the first imaging system provides a wide-angle view of the area being monitored. The wide angle view is then used to control the adjustable view settings of the second imaging systems, which are capable of providing greater resolution images of regions of interest within the area.

In a preferred embodiment of the surveillance and monitoring system of the present invention, the adjustable view settings include pan, tilt, and zoom settings for adjusting the panning, tilting, and zooming of the one or more second imaging systems with respect to the area being monitored.

In another preferred embodiment of the surveillance and monitoring system of the present invention, the area is substantially hemispherical and the first imaging system has a substantially hemispherical field of view.

In another preferred embodiment of the surveillance and monitoring system of the present invention, the first imaging system is a catadioptric system, which includes a reflecting surface positioned to reflect an image of the area being monitored and one or more image sensors optically coupled to the reflecting surface. Most preferably, the reflecting surface of the catadioptric system is a truncated, substantially paraboloid-shaped mirror. Alternatively, the reflecting surface of the catadioptric system may include a substantially hyperboloidal-shaped mirror, a substantially ellipsoidal-shaped mirror, one or more curved mirrors, or one or more planar mirrors.

Instead of catadioptric systems, the first imaging system may include wide-angle imaging optics coupled to one or more image sensors. Such optics may include a wide-angle lens or a fish-eye lens. In addition, the first imaging system may include a plurality of camera systems.

In yet another preferred embodiment of the present invention, a monitoring station is provided, which includes one or more displays, at least one display coupled to the first imaging system for displaying an image of the area being monitored and at least one display coupled to the one or more second imaging systems for displaying a region of interest within the area. The monitoring station includes input means for selecting the region of interest from the display coupled to the first imaging system. The input means is operatively coupled to the controls for controlling the adjustable view settings, such that at least one of the second imaging systems is positioned to view the region of interest.

In yet another preferred embodiment of the present invention, the first imaging system provides an image signal representative of the area being monitored, and the surveillance and monitoring system further includes an image signal processing apparatus coupled to the first imaging system to convert the image signal into image signal data. Preferably, the image signal processing apparatus includes means for mapping the image signal data into a Cartesian-coordinate system to produce a perspective image or into a cylindrical-coordinate system to produce a panoramic image.

In yet another preferred embodiment, the surveillance and monitoring system of the present invention further includes motion detection means coupled to the first imaging system for detecting objects in motion in the area being monitored. Preferably, the motion detection means is coupled to a tracking means for tracking one or more of the objects in motion. The tracking means may then be coupled to the controls for the adjustable view settings of the second imaging systems to view the objects being tracked with the second imaging systems.

In yet another preferred embodiment of the present invention, a surveillance and monitoring system for monitoring an area is provided comprising: a wide-angle imaging system having a wide-angle field of view approximately equal to or greater than the area; motion detection means coupled to the imaging system for detecting objects in motion in the area; tracking means coupled to the motion detection means for tracking one or more of the detected objects in motion; and image processing means coupled to the tracking means and the wide-angle imaging system for producing perspective images of the tracked objects from images provided by the wide-angle imaging system.

In accordance with the present invention, a method is also provided for monitoring an area. The method includes the steps of: sensing a global image of the area being monitored with a first imaging system having a field of view approximately equal to or greater than the area; detecting a region of interest within the global image; and sensing one or more detailed images of the region of interest with at least one of the one or more second imaging systems, at least one of the detailed images having a higher resolution than the global image.

In another preferred embodiment of the present invention, a method is provided which includes the steps of: positioning a first imaging system to view the area, the first imaging system having a wide-angle field of view approximately equal to or greater than the area; positioning one or more second imaging systems having adjustable view settings to view portions of the area, each of the one or more second imaging systems being capable of producing images of the portions with a resolution greater than the first imaging system; sensing an image of the area with the first imaging system; detecting a region of interest within the sensed image; and controlling the adjustable view settings so as to view the region of interest with at least one of the one or more second imaging systems.

In accordance with the present invention, a method for monitoring one or more objects in motion in an area is also provided, which includes the steps of: positioning a first imaging system to view the area, the first imaging system having a wide-angle field of view approximately equal to or greater than the area; positioning one or more second imaging systems having adjustable view settings to view portions of the area, each of the one or more second imaging systems being capable of producing images of the portions with a resolution greater than the first imaging system; sensing images of the area with the first imaging system; detecting the one or more objects in motion from the sensed images; tracking one or more of the detected objects; and controlling the adjustable view settings so as to view the tracked objects with at least one of the one or more second imaging systems.

Preferably, the step of detecting in the method for monitoring one or more objects in motion includes the sub-steps of: generating a series of image frames at predetermined time intervals from the sensed images; filtering the series of image frames for noise; calculating a moving average frame from a subset of the series of image frames comprising the set from the first image frame to the next-to-last image frame; subtracting the filtered, last image frame of the series of image frames from the moving average frame to produce a difference image frame; comparing each pixel of the difference image frame to a predetermined threshold value to produce a threshold image frame indicative of regions of motion in the area; defining a first group of objects associated with the subset of the series of image frames; associating a second group of objects with the regions of motion in the threshold image frame; and generating a third group of objects comprising all unique objects in the first and second groups.

In a preferred embodiment, the tracking step in the method for monitoring one or more objects in motion includes the sub-steps of: selecting a fourth group of objects to be tracked from the third group of objects on the basis of a predetermined criteria; determining a focus point for each object in the fourth group of objects; and applying a smoothing function to the focus point of each object.

Further, a preferred embodiment of the controlling step in the method for monitoring one or more objects in motion includes mapping the coordinates of the objects being tracked from the coordinate system of the first imaging system into the coordinate system of at least one of the second imaging systems.

BRIEF DESCRIPTION OF THE DRAWINGS

Exemplary embodiments of the present invention will now be described in detail with reference in the accompanying drawings in which.

DETAILED DESCRIPTION

Figure 1:
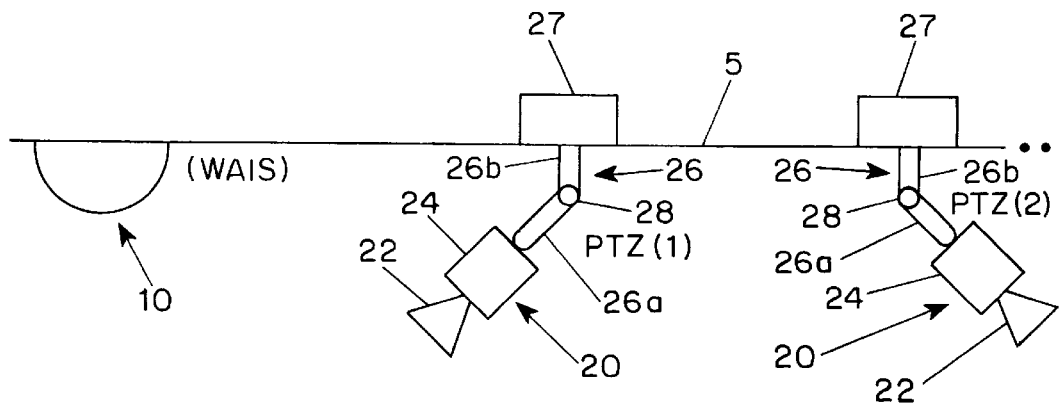
FIG. 1 is a side view of a video surveillance and monitoring system according to a preferred embodiment of the present invention.

FIG. 1 shows a preferred embodiment of the present invention. Arranged along a ceiling 5 is a wide-angle imaging system ("WAIS") 10, which has a field of view approximately equal to or greater than the area being monitored. Also arranged along the ceiling 5 are one or more pan, tilt, and zoom ("PTZ") imaging systems 20. FIG. 1 shows, for example, two such imaging systems arranged along the ceiling 5. Each PTZ system 20 has a field of view smaller than that of the WAIS 10, but has a resolution that is relatively greater. As illustrated in FIG. 1, each PTZ system 20 includes optics 22, a camera 24 for sensing the images provided by the optics 22, a pivot arm 26 for movement of the camera 24 and optics 22, and a PTZ controller 27 mounted to the ceiling 5 for controlling the movement of the pivot arm 26. The pivot arm 26 is divided into two segments, a lower segment 26a connected to the camera 24 and an upper segment 26b pivotably mounted to the PTZ controller 27. The two segments 26a and 26b are joined by a pivot 28. In this embodiment, the pivot arm 26 provides each PTZ system 20 with a two-degree freedom of movement. Specifically, the pivotal connection of the upper segment 26b with the PTZ controller 27 provides each PTZ system 20 with the ability to pan around an axis perpendicular to the ceiling 5, and the pivot 28 between the and lower and upper segments 26a and 26b provides each PTZ system 20 with the ability to tilt with respect to the plane of the ceiling 5. Preferably, the optics 22 includes a zoom lens, which allows magnification of a region of interest within a PTZ system's field of view.

In use, the WAIS 10 of the present invention provides a global view of the area being monitored. When a region of interest within the monitored area is detected in the global view provided by the WAIS 10, one or more of the PTZ systems 20 are moved to view the region of interest and are used to obtain high-resolution, magnified images of that region.

Figure 13:
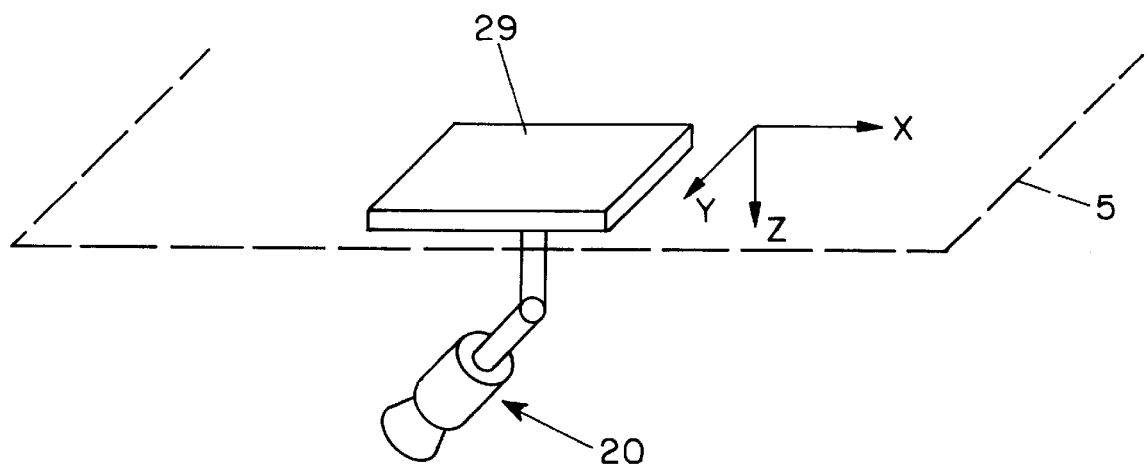
FIG. 13 is a perspective view of a video surveillance and monitoring system according to another preferred embodiment of the present invention, in which the pan, tilt, and zoom camera is mounted on a movable base.
Figure 14:
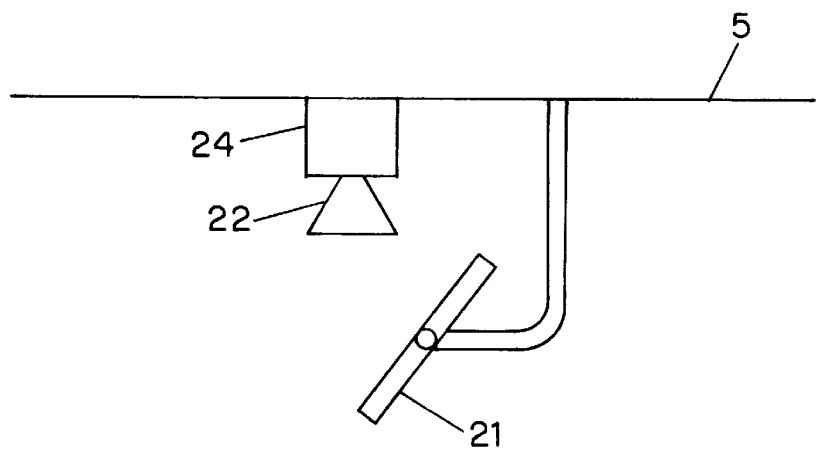
FIG. 14 is a side view of a video surveillance and monitoring system according to another preferred embodiment of the present invention, in which the pan, tilt, and zoom camera contains a fixed camera and fixed optics and a movable mirror positioned between the camera and optics and the area to be monitored.

Although each PTZ system 20 of the preferred embodiment just described includes a pivot arm 26 providing a two-degree freedom of movement for each system, the presently claimed invention is, of course, not limited to such an embodiment. For example, a third degree of freedom could also be added to each PTZ system 20 by adding a means for rolling or rotating the camera 24 and optics 22 around the optical axis. In addition, the camera may have focus and iris settings. As shown in FIG. 13, a PTZ system 20 could also include a movable base 29, which provides translational movement in three perpendicular axes x, y, and z. This movable base 29 provides another three degrees of freedom of movement to each PTZ system 20. Moreover, as shown in FIG. 14, instead of moving the camera and optics of a PTZ system 20, the PTZ system 20 could have a fixed camera 24 and fixed optics 22 and a movable mirror 21 positioned between them and the area to be monitored. In this embodiment, the movable mirror 21 provides the panning and tilting capability for each PTZ system 20.

Figure 2:
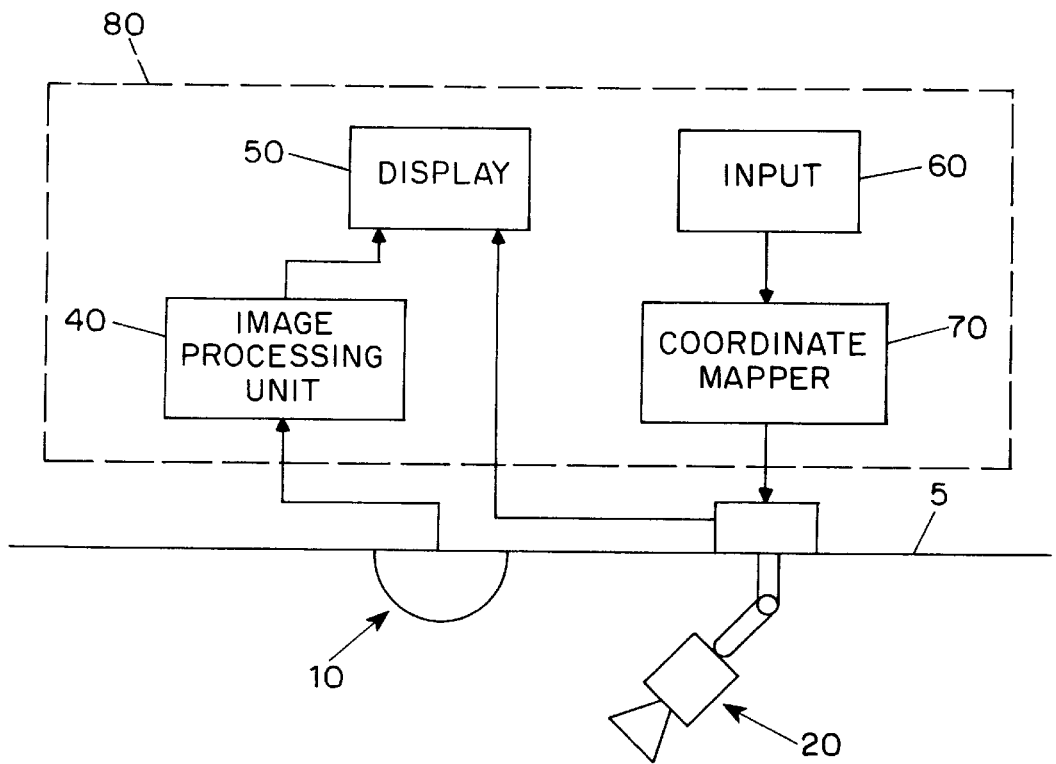
FIG. 2 is a functional block diagram of a video surveillance and monitoring system according to another preferred embodiment of the present invention.

FIG. 2 provides a functional block diagram of a surveillance and monitoring system according to another preferred embodiment of the present invention. In the embodiment of FIG. 2, a WAIS 10 is used in combination with a single PTZ system 20. The WAIS 10 provides images to a display 50, preferably through an image processing unit 40. The display 50 is part of a monitoring station 80, which is attended to by an operator. The operator stationed at the monitoring station 80 observes the images provided by the WAIS 10, and when the operator detects a region of interest within the area being monitored and desires to get a better view of the region, the operator selects the region using input means 60. Input means 60 may include any well-know type of input device, such as a keyboard, a mouse, a joystick, or a touch-sensitive panel. The input means 60 communicates the input data provided by the operator to a coordinate mapping unit 70. Using the input data, the coordinate mapping unit 70 provides the appropriate pan, tilt, and zoom settings to the PTZ system 20, so that the PTZ system 20 is directed to view the region of interest. The PTZ system 20 subsequently provides high-resolution, zoomed images of the region of interest to the display 50.

While it is possible to display the raw image output from the WAIS 10 on the display 50, preferably, as shown in FIG. 2, the images from the WAIS 10 are processed through an image processing unit 40 before they are displayed on the display 50. The image processing unit 40 maps the image data from the WAIS 10 into either a Cartesian-coordinate system to produce a perspective image or into a cylindrical-coordinate system to produce a panoramic image. Such mapping makes it easier for a human operator to interpret the image being displayed and, hence, to select a region of interest.

Figure 3A:
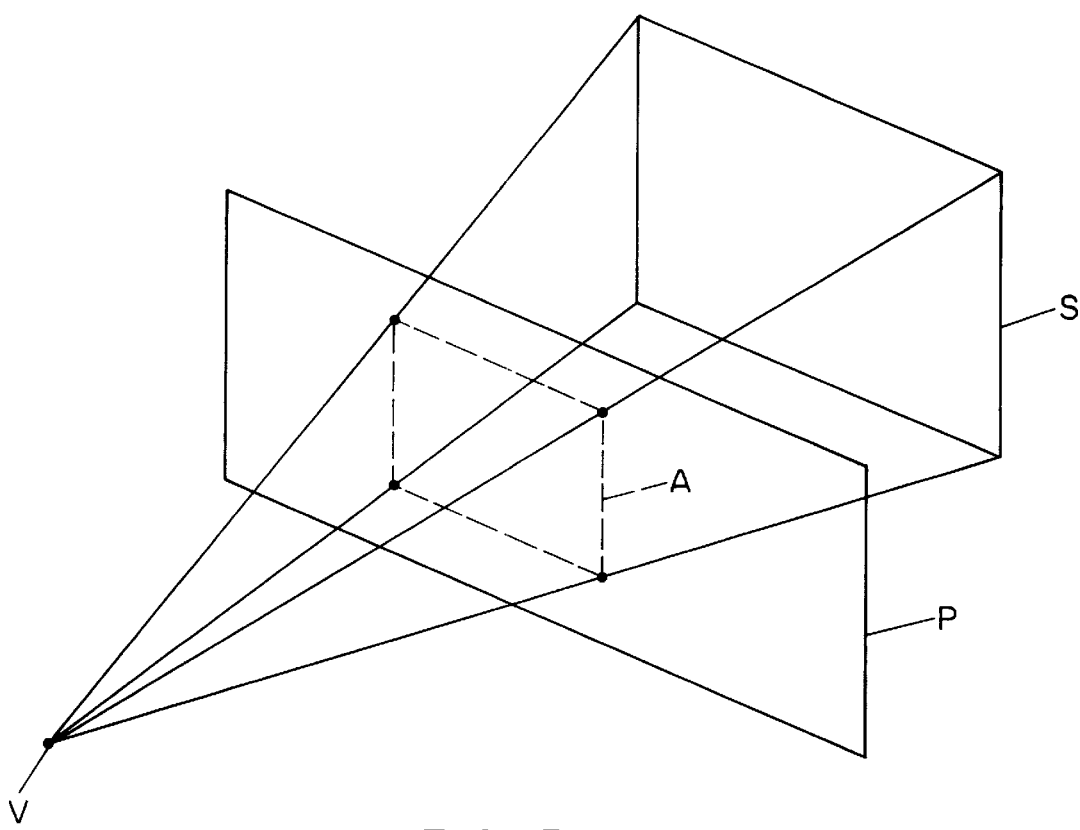
FIG. 3A provides an illustration of perspective mapping.
Figure 3B:
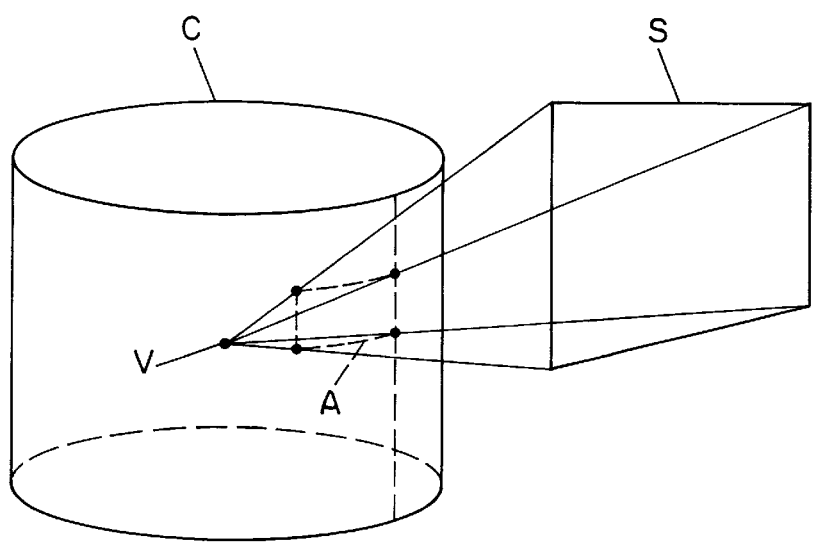
FIG. 3B provides an illustration of cylindrical mapping.

The details of the perspective and panoramic mapping will depend on the exact type of WAIS 10 used, but the general principles are well known in the art and are described, for example, in S. E. Chen, "Quicktime VR—An Image-Based Approach to Virtual Environment Navigation", Proc. of SIGGRAPH 95, (8):29–38, August 1995. The general principles are also briefly illustrated in FIGS. 3A and 3B. FIG. 3A illustrates a perspective mapping of a scene S from a viewpoint V. The perspective mapping is the projection A onto a plane P, the projection A consisting of the points of intersection of plane P with rays from scene S passing through the viewpoint V. FIG. 3B illustrates a panoramic mapping of a scene S from a viewpoint V. The panoramic mapping is the projection A of the scene S onto a cylinder C surrounding the viewpoint V. The projection A consists of the points of intersection of the cylinder C with the rays from scene S passing through the viewpoint V. Advantageously, by mapping onto a cylinder, a complete 360 degree view of the scene may be obtained. The cylindrical projection may then be further mapped onto a plane for a panoramic display on a flat screen. The cylinder-to-plane mapping may be visualized by cutting the cylinder in FIG. 3B length-wise and flattening it out.

Figure 4:
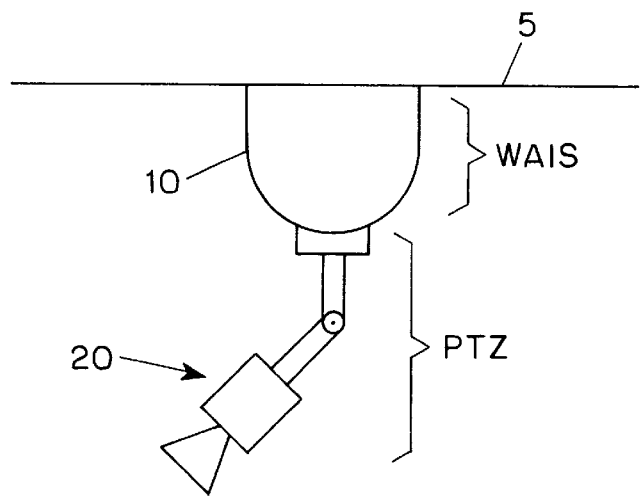
FIG. 4 is a side view of a video surveillance and monitoring system according to another preferred embodiment of the present invention, in which the pan, tilt, and zoom camera is positioned directly underneath the wide-angle imaging system.

To provide appropriate pan, tilt, and zoom settings to the PTZ system 20, the coordinate mapping unit 70 must map the coordinates of a region or object of interest in the WAIS 10 to the corresponding coordinates in the PTZ system 20. To avoid or simplify such mapping, it is preferred that PTZ system 20 should be placed very close to the WAIS 10. The close proximity of the PTZ system 20 and the WAIS 10 ensures that the viewing directions of both systems are about the same. Therefore, mapping of object coordinates from the WAIS 10 to the PTZ system 20 involves little, or no, computation. FIG. 4 shows an especially preferred embodiment of an arrangement of a WAIS 10 and a PTZ system 20, in which the PTZ system 20 is placed directly underneath the WAIS 10.

In practice, of course, it may be necessary to have one or more PTZ systems distributed around, instead of in close proximity to, a WAIS. In that case, to translate object coordinates between systems, assumptions must be made about the distance of objects from the WAIS 10 and the PTZ systems 20, given the geometry of the area being monitored. For example, assuming the area being monitored contains a flat, level floor, an assumption can be made that the objects of interest will be at or near the known floor level of the area being monitored (as in the case of humans walking about the area).

Figure 5A:
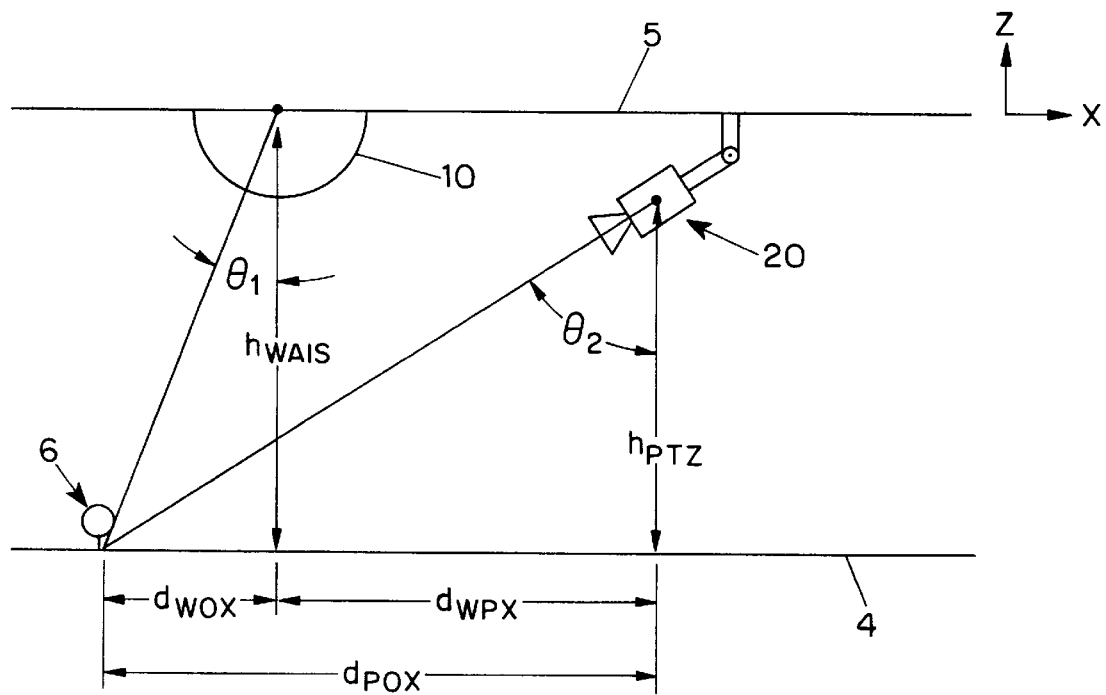
FIGS. 5A and 5B illustrate the mapping of object coordinates from the coordinate system of a wide-angle imaging system to the coordinate system of a pan, tilt, and zoom imaging system.
Figure 5B:
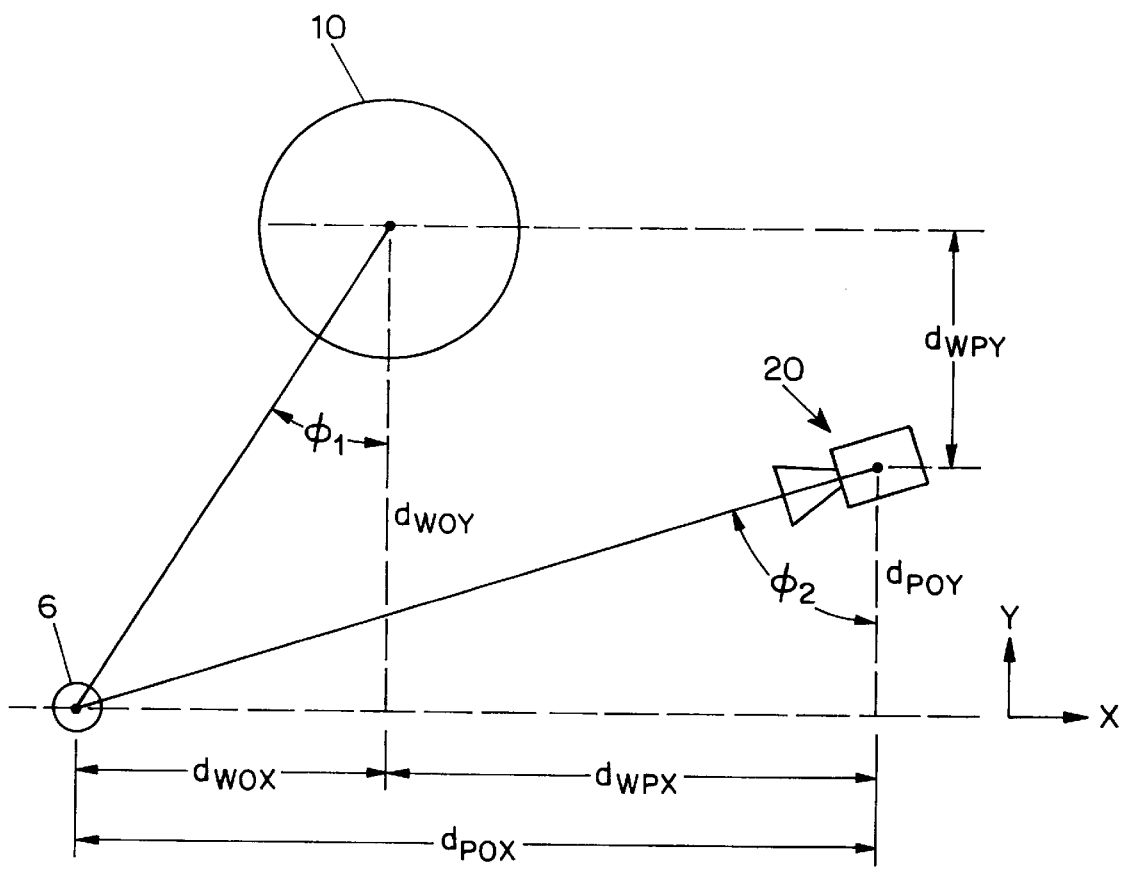

FIGS. 5A and 5B illustrate the relationships between the coordinate systems of a WAIS 10 and a PTZ system 20 when the PTZ system 20 is not located near the WAIS 10. In the figures, an object 6 is observed in the WAIS 10 having coordinates $(\theta_1,\phi_1)$ and corresponding coordinates in the PTZ system 20 of $(\theta_2, \phi_2)$. The angles $\theta_1$ and $\theta_2$ define the coordinate angle of the object in the x-z plane, which is perpendicular to the ceiling and floor, and the angles $\phi_1$ and $\phi_2$ define the coordinate angle of the object in the x-y plane, which is parallel to the ceiling and floor. An assumption is made that the object 6 is located at floor level (or at a fixed height from the floor level), which is a known perpendicular distance $h_{wais}$ from the WAIS 10 and a known perpendicular distance $h_{ptz}$ from the PTZ system 20. Using this assumption, the distance between the WAIS 10 and the object 6 along the x-axis, $d_{wox}$, can be derived as shown in equation (1).

$$d_{wox}=h_{wais} \tan \theta_1 \tag{1}$$

Similarly, the distance between the PTZ system 20 and the object 6 along the x-axis, $d_{pox}$, can be derived as shown in equation (2).

$$d_{pox}=h_{ptz} \tan \theta_2 \tag{2}$$

Using the relationship of equation (3), $$d_{pox} = d_{wox} + d_{wpx} \quad (3)$$

where $d_{wpx}$ is the known distance along the x-axis of the WAIS 10 from the PTZ system 20, angle $\theta_2$ can be derived by those of ordinary skill in the art as shown in equation (4).

$$\tan\theta_2 = \frac{h_{wais}\tan\theta_1 + d_{wpx}}{h_{ptz}} \quad (4)$$

In a similar manner, the angle $\phi_2$ can be derived as shown in equations (5), (6), and (7).

$$d_{poy} = d_{woy} - d_{wpy} \quad (6)$$

$$d_{woy} = \frac{d_{wox}}{\tan\phi_1} = \frac{h_{wais}\tan\theta_1}{\tan\phi_1} \quad (5)$$

$$d_{poy} = d_{woy} - d_{wpy} \quad (6)$$

$$\tan\phi_2 = \frac{d_{wox} + d_{wpx}}{d_{poy}} = \frac{d_{wox} + d_{wpx}}{d_{woy} - d_{wpy}} = \frac{h_{wais}\tan\theta_1\tan\phi_1 + d_{wpx}\tan\phi_1}{h_{wais}\tan\theta_1 - d_{wpy}\tan\phi_1} \quad (7)$$

In equations (6) and (7), $d_{wpy}$ is the known distance between the WAIS 10 and the PTZ system 20 along the y-axis. Using equations (4) and (7), therefore, the PTZ mapping unit 70 may map object coordinates from the coordinate system of the WAIS 10 to that of the PTZ system 20.

Figure 6:
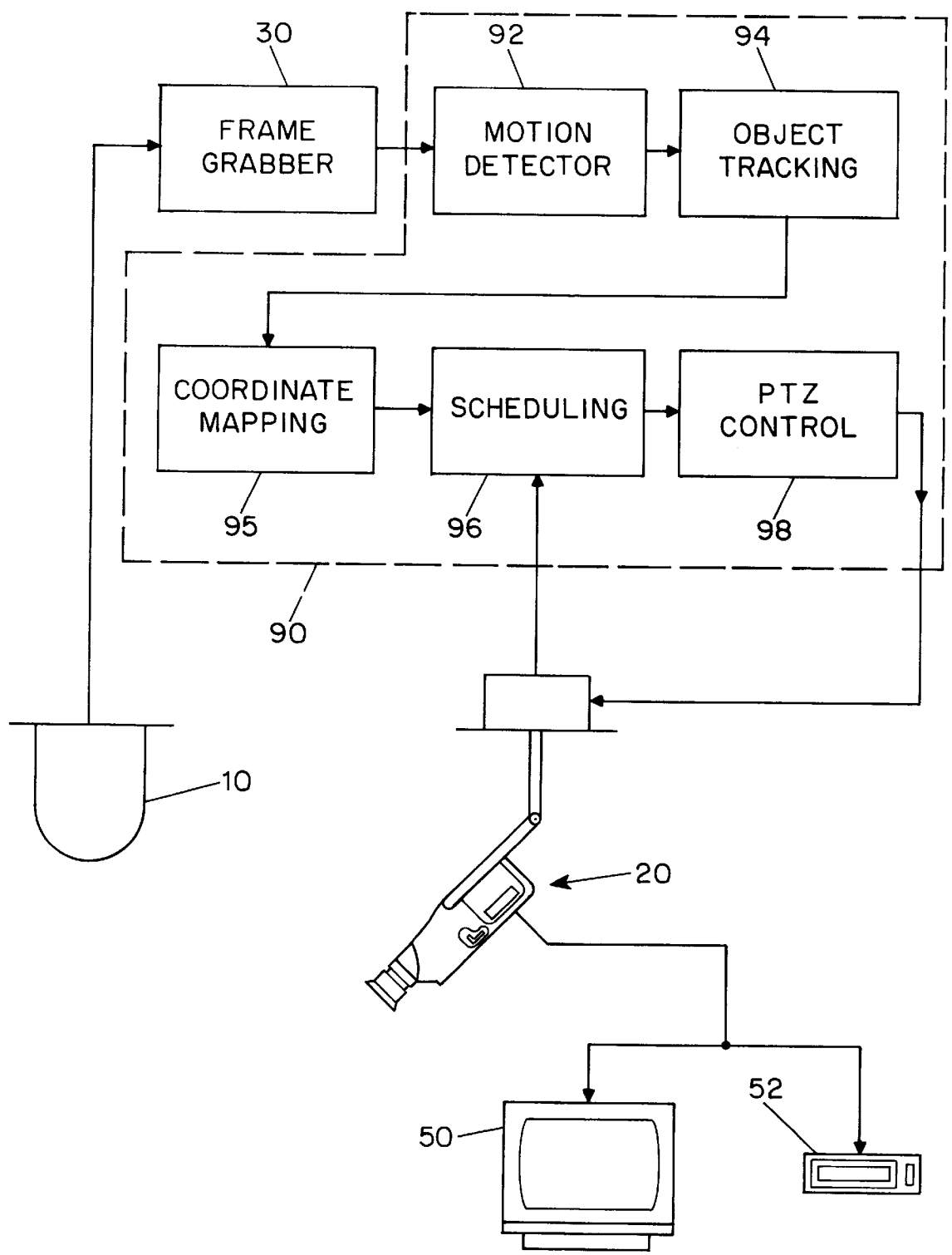
FIG. 6 is a functional block diagram of a video surveillance and monitoring system according to another preferred embodiment of the present invention.

FIG. 6 provides a functional block diagram of a surveillance and monitoring system according to another preferred embodiment of the present invention. In this embodiment, the WAIS 10 provides image data to a frame grabber 30, which captures image frames from the WAIS 10 at predetermined intervals. The frame grabber 30 provides the image frames to a motion detection unit 92, which algorithmically detects the movement of objects within a series of image frames. The motion detection unit 92 communicates with an object tracking unit 94, which tracks the detected objects. The object tracking unit 94 communicates with a coordinate mapping unit 95, which maps the coordinates of objects from the coordinate system of the WAIS 10 to that of the PTZ system 20, as discussed previously.

When a single PTZ system is used to track multiple objects, as in the embodiment of FIG. 6, the PTZ system 20 must be time-shared among the objects being tracked. Accordingly, it is preferred that a PTZ scheduling unit 96 is included, which prioritizes the objects being tracked by the object tracking unit 94. The PTZ scheduling unit 96 continuously updates the priority of objects being tracked based on information provided by the PTZ system 20 and the object tracking unit 94, such as the current position, velocity, and acceleration of the PTZ system 20 and the objects.

The PTZ scheduling unit 96 communicates with a PTZ driver unit 98. Using the priorities set by the PTZ scheduling unit 96, the PTZ driver unit 98 sends appropriate commands to the PTZ controller of the PTZ system 20 so that the PTZ system 20 spends a predetermined amount of time on each object that is tracked. Alternatively, instead of using a single PTZ system and time-sharing among objects, multiple PTZ systems may be used to track multiple objects of interest simultaneously.

As shown in FIG. 6, the output of the PTZ system 20 may be viewed on a display 50 in real time. The display 50 may contain multiple windows for each of the objects being tracked. In addition, the output of the PTZ system 20 may also be recorded on recording equipment 52, such as a tape recorder or disk drive, for later viewing. If the output of the PTZ system 20 is recorded, advantageously a time stamp may also be recorded with the images. In addition, the output of the WAIS 10 may also be recorded for later viewing. By recording the output of the WAIS 10, a user is able to view not just detailed images of the objects of interest, but also their surroundings.

In an exemplary embodiment of FIG. 6, the WAIS 10 comprises a PARACAMERA from CYCLOVISION TECHNOLOGIES of New York, N.Y., used in conjunction with a Model GP KR222 camera from PANASONIC. The PTZ system 20 is a SONY CCD-IRIS camera mounted on a Model No. PTU-46-17.5 PTZ controller from DIRECTED PERCEPTION of Burlingame, Calif. The motion detection unit 92, object tracking unit 94, coordinate mapping unit 95, PTZ scheduling unit 96, and PTZ driver unit 98 are implemented in software within a general purpose computer 90. The general purpose computer 90 may be, for example, an INTEL PENTIUM PRO 200 MHZ system, running the MICROSOFT WINDOWS NT 4.0 operating system, and including a MATROX PPB frame grabber add-on board from MATROX ELECTRONIC SYSTEMS LTD., 1055 St. Regis Blvd., Dorval, Quebec, Canada H9P 2T4. The display 50 and recording equipment 52 may also be part of the general purpose computer 90.

Figure 7A:
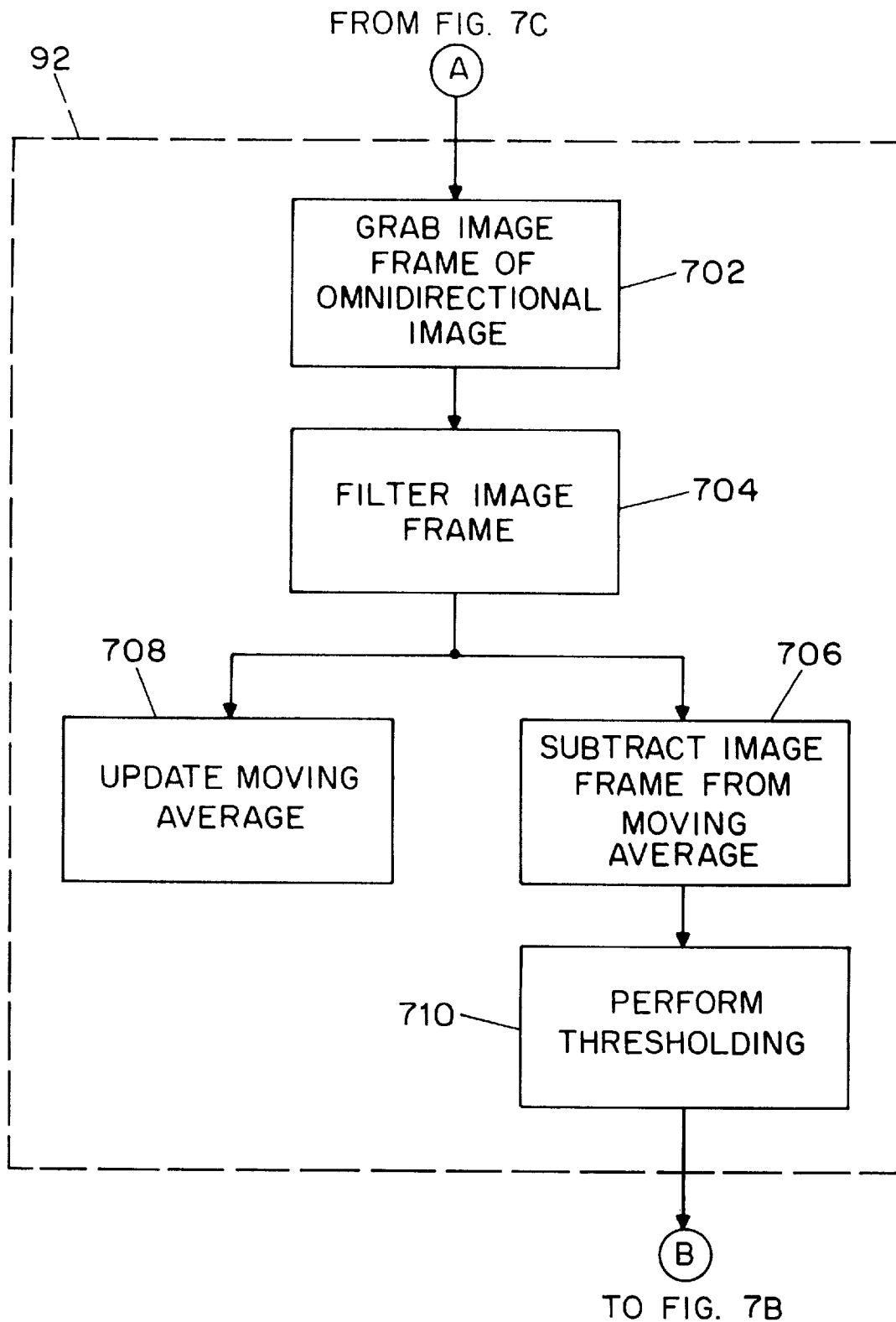
FIGS. 7A to 7C provide a flowchart of a preferred embodiment of a method for monitoring one or more objects in motion in an area.
Figure 7B:
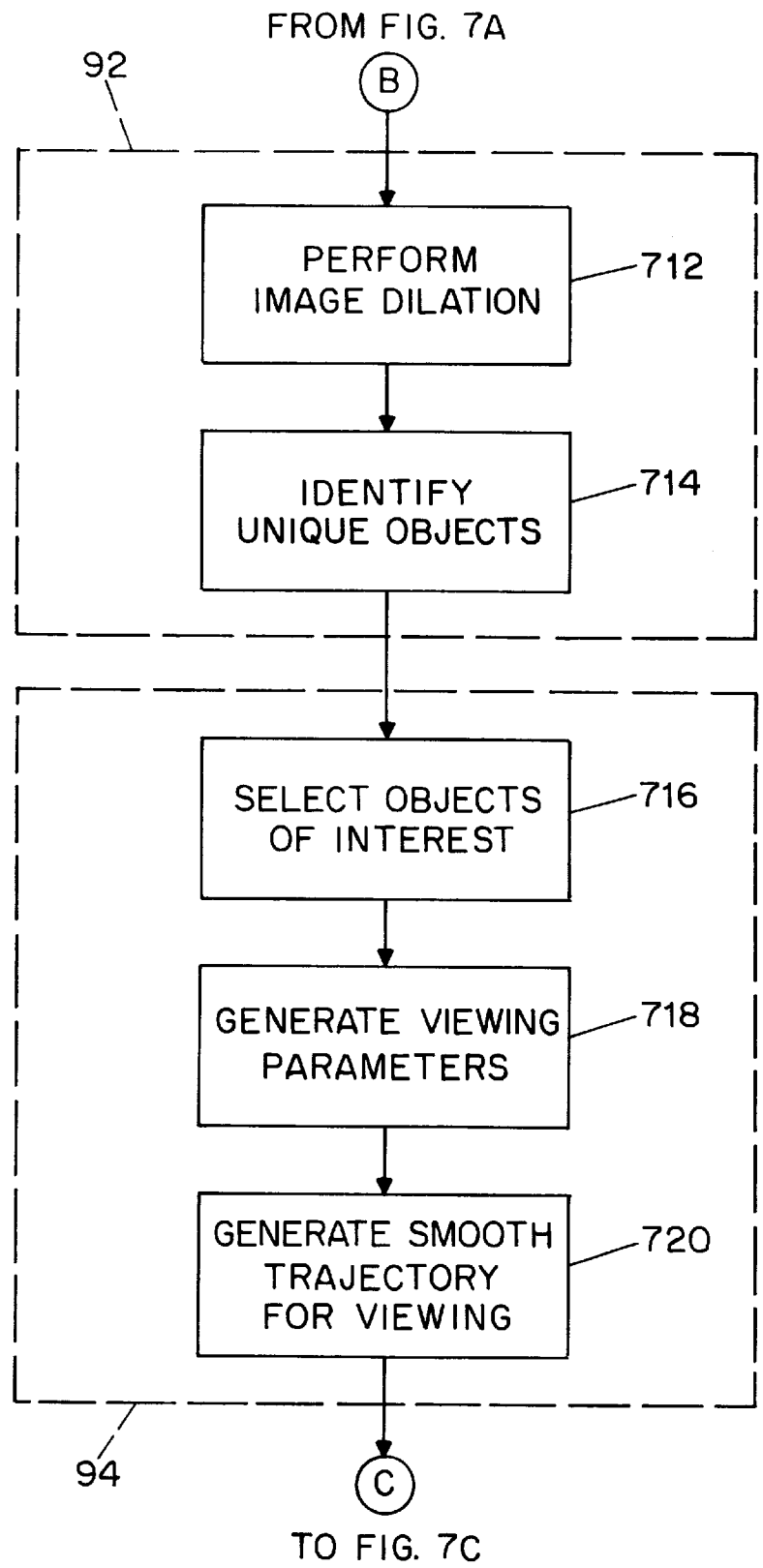
Figure 7C:
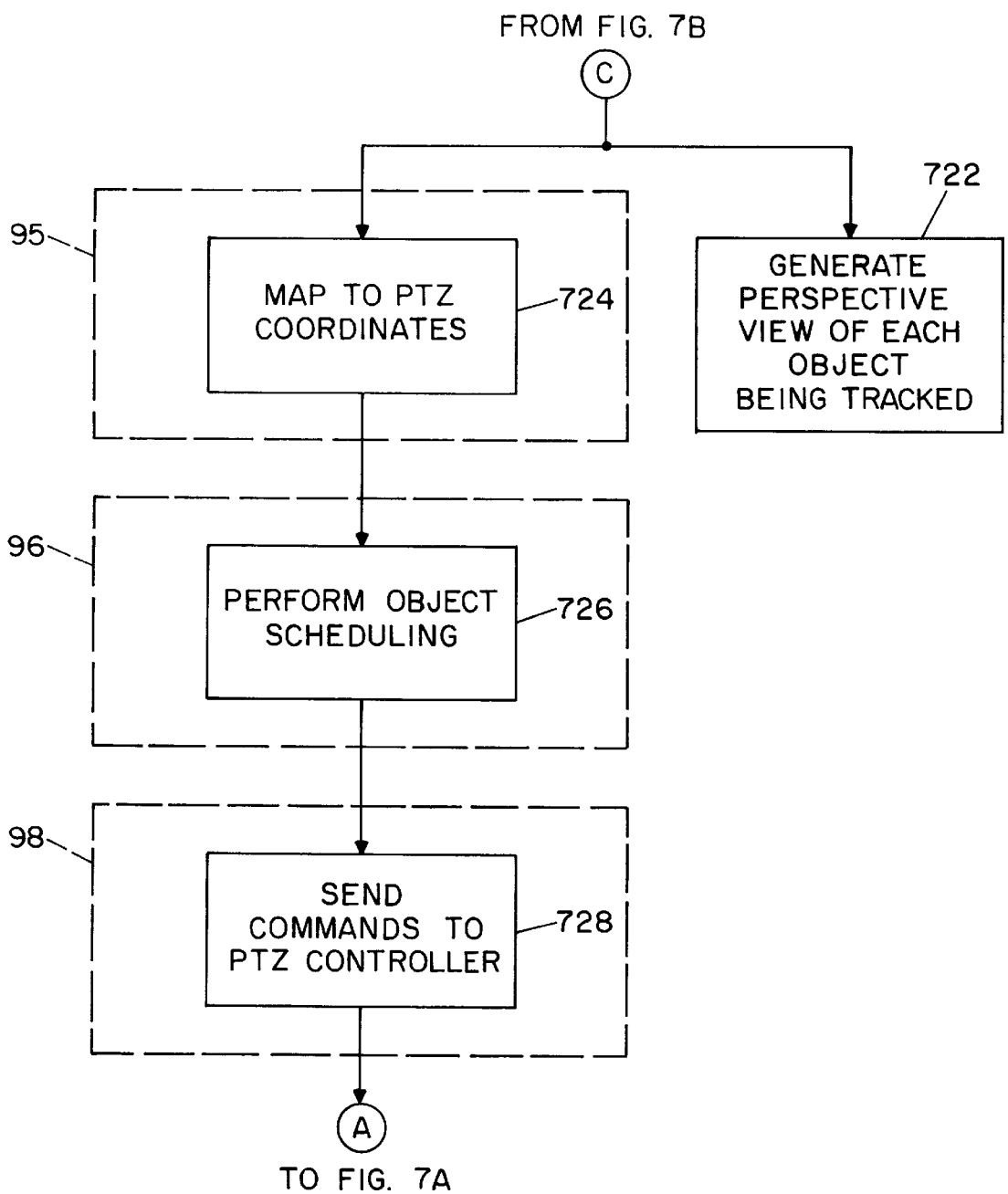

Referring to FIGS. 7A through 7C, a flow-chart is shown detailing the steps of a preferred method for monitoring objects in an area. These steps may be programmed in software in a general purpose computer 90. An exemplary correspondence of the steps with the embodiment of FIG. 6 is shown by the dotted lines. Of course, it is clear that those skilled in the art may also easily implement the functionality of one or more of these steps in special-purpose hardware.

In step 702, an image frame $I_t$ is retrieved from the frame grabber 30. If the image is a color image, the image frame $I_t$ may consist of separate color channels as, for example, red, green, and blue channels. In that case, all of the following computations may be performed with respect to each color channel. Alternatively, the color channels may be summed up to obtain a black and white image.

Because images are prone to camera noise (i.e., changes in pixel intensities over time), in step 704, the image frame $I_t$ is filtered to remove any such noise. Any known noise filter may be used as. An exemplary filter is a box filter with a four-by-four (4×4) box size. This filter takes a four-by-four set of pixels in the image frame $I_t$ and generates a single output pixel that is the average of the intensities of the pixels in the set. Of course, this filter reduces the resolution of the image frame $I_t$ by four. The noise filter produces a filtered image frame $FI_t$.

Since speed is critical in real-time applications, filtering is performed only in the image frame area that corresponds to the active imaging area of the WAIS 10. For example, if the WAIS 10 produces a circular image on a CCD, only the corresponding circular image area in the image frame $I_t$ is filtered. In addition, to further maximize performance, running balances may be maintained as the scan lines of image frame $I_t$ are read. For example, assuming that a four-by-four (4×4) box filter is used and that hypothetically the image frame $I_t$ is twelve (12) pixels wide, three variables $s_1$, $s_2$, and $s_3$ may be used to store the sum of pixels 1 to 4, pixels 5 to 8, and pixels 9 to 12, respectively, when the first scan line of $I_t$ is read. When the second scan line of $I_t$ is read, the sums of pixels 1 to 4, pixels 5 to 8, and pixels 9 to 12 of the second scan line are added to $s_1$, $s_2$, and $s_3$, respectively. Variables $s_1$, $s_2$, and $s_3$ are updated in the same manner when the third and fourth scan lines are read. After the fourth scan line is read, $s_1$, $s_2$ and $s_3$ are divided by sixteen to obtain the box filter output for the first three four-by-four (4×4) boxes in the image frame $I_t$. The process is repeated until all of the scan lines of $I_t$ are read. In this manner, memory access time is minimized.

In step 706, the filtered image frame $FI_t$ is subtracted from the moving average image frame $M_{t-1}$ to produce a difference image frame $D_t$. The moving average image frame $M_{t-1}$ represents a historical average of all past image frames. Thus, if the difference image frame $D_t$ is not zero, then something in the current image frame is different than in the past, and there is an indication of movement in the image. The reason the current image frame $FI_t$ is compared to the moving average image frame $M_{t-1}$, instead of simply to the last image frame $FI_{t-1}$, is to account for gradual changes in the lighting of the monitored area.

In step 708, the moving average image frame is updated. Any moving average function may be used. An exemplary function is shown in equation (8).

$$M_t = \alpha M_{t-1} + (1-\alpha) FI_t \tag{8}$$

An exemplary value of $\alpha$ in equation (8) is 0.75. Using a ratio for $\alpha$ with a denominator that is an exponential value of two (2) is advantageous because it allows the use of binary shifting to perform multiplication and division by $\alpha$, instead of using floating point operations. Binary shifting is the shifting of bits of a binary-represented number. As is well known by those in the art, each time a binary number is shifted to the left, the binary number doubles; and each time a binary number is shifted to the right, the binary number is divided by two. It is also well known that the use of binary shifting is faster than the use of floating point operations and, thus, minimizes calculation time.

To account for any noise that may not have been filtered out in step 704, in step 710, each pixel of the difference image frame $D_t$ is compared to a threshold value. Based on this comparison, a threshold image frame $T_t$ is created. Each pixel in $T_t$ has a value of "1" if the corresponding pixel in $D_t$ is above the threshold value and a value of "0" if the corresponding pixel in $D_t$ is below the threshold value. The pixels in $T_t$ with a value of "1" indicate motion in the corresponding region of $I_t$. Advantageously, the step of comparing each pixel in $D_t$ to a threshold value and generating $T_t$ may be performed simultaneously with the step of subtracting $FI_t$ from $M_{t-1}$.

Once regions of motion are detected in $T_t$, the regions must be associated with objects. This association is not as easy as associating each continuous region with an object because a single object may produce multiple regions of motion. For example, moving persons may produce movement in the regions of both their arms and legs. To determine which regions constitute a single object, image dilation is performed on $T_t$ in step 712. Image dilation consists of spreading or smearing those pixels in $T_t$ that indicate motion (i.e., have a value of "1"). For example, for each pixel indicating motion in $T_t$, a box of pixels surrounding the motion-indicating pixel is selected, and the box is filled with the value "1". As a result of this image dilation process, separate regions merge together. The remaining continuous regions are characterized as single objects and are labeled for identification.

Once objects are associated with regions of motion in $T_t$, it is determined in step 714 whether any of these objects correspond to objects that have been previously identified. In general, such a determination will involve both temporal and spatial reasoning. A simple manner in which this determination can be made, however, is to compare the currently generated dilation frame with a previously-generated dilation frame and to assume that objects that overlap in the two frames are the same. Of course, more complicated and robust methods could also be used. For example, models of the objects could be built and could be tested against the behavior of objects in the current and past frames. After the current objects are correlated with the past objects, all unique objects are labeled for identification.

In step 716, a selection is made as to which objects to track. The selection criteria is necessarily application specific, but examples of such criteria are the size, shape, duration of existence, and location of objects.

In step 718, specific viewing parameters are generated for each object to be tracked. That is, each object is usually spread out over some area in the image. In this step, it is determined on which point of the object to focus. Such a determination may be performed, for example, by determining the centroid (center of mass) of each object's area in the dilated image frame. Alternatively, the center of the bounding box for each object in the dilated image frame may be used. More preferably, a weighted average of the centroid and the center of the bounding box may be used.

It is possible that, because of the time required for the calculations described above, the viewing parameters determined in step 718 will not generate a smooth trajectory for an object over time. Therefore, the video image of an object as viewed from the PTZ system may appear "jerky." To avoid this jerkiness, in step 720, a smoothing function is applied to the viewing parameters generated in step 718. Kalman filters, such as Wiener filters, have been tried and have been found to work robustly. A disadvantage to using these smoothing filters is that the smoothed viewing position of the object may lag behind the actual position of the object. To compensate for this effect, a feed-forward term is preferably added to the output of these smoothing filters. An exemplary feed-forward term is twice the difference between the previous smoothed viewing position and the previous actual object position. In addition, an adaptive filter, which changes the rate of acceleration of the viewing position based on the rate of acceleration of the object may also be used.

In step 722, optionally, a perspective or panoramic display of the objects being tracked may be generated from the image frame $I_t$ provided by the wide-angle imaging system based on the viewing parameters generated in step 720 and the size and center of the objects being tracked. Perspective and panoramic mapping is performed as discussed in relation to FIGS. 3A and 3B. Preferably, each object is displayed in its own window.

In step 724, the smoothed viewing parameters are mapped from the WAIS coordinate system to the PTZ coordinate system, as described previously. In step 726, scheduling of the objects is performed. A simple first-in, first-out (FIFO) queuing system in which the first-observed objects receive the highest priority may be used. Of course, more complicated heuristics could also be implemented. Once scheduling is completed, in step 728, the PTZ driver unit 98 converts the PTZ object coordinates into manufacturer-specific codes for the PTZ controller of the PTZ system 20.

Figure 8:
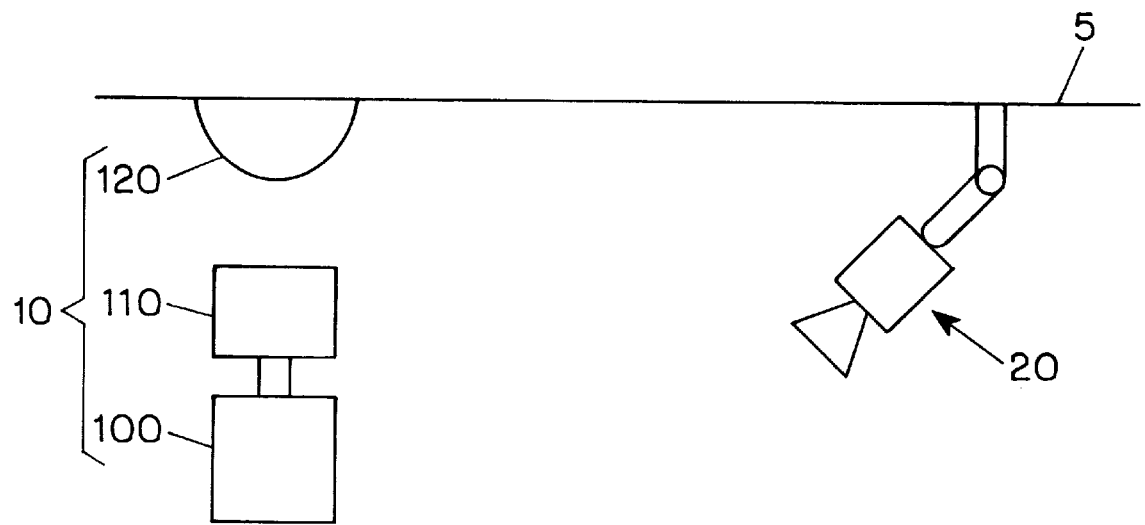
FIG. 8 is a side view of a video surveillance and monitoring system according to another preferred embodiment of the present invention, in which the wide-angle imaging system includes a catadioptric system with a paraboloid-shaped mirror.

FIG. 8 illustrates a preferred embodiment of a wide-angle imaging system for use with the present invention. The WAIS 10 comprises a camera 100 having a telecentric means 110 attached to it, which are positioned below a paraboloid-shaped mirror 120. As described fully in U.S. patent application Ser. No. 08/644,903, filed on May 10, 1996, (issued as U.S. Pat. No. 5,760,826 on Jun. 2, 1998) entitled "An Omnidirectional Imaging Apparatus," and in the continuation-in-part application of the same title, U.S. patent application Ser. No. 08/986,082, filed on Dec. 5, 1997, (currently pending) both of which are incorporated by reference herein, the paraboloid-shaped mirror 120 orthographically reflects any principal rays of a scene that would otherwise pass through the focus of the paraboloid. The telecentric means 110 filters out any rays of light that are not orthographically reflected by the paraboloid-shaped mirror 120. The telecentric means 110 may be a telecentric lens, a telecentric aperture, or a collimating lens used in combination with imaging optics.

When the paraboloid-shaped mirror is truncated at a plane passing through its focus and normal to its paraboloidal axis, the paraboloid-shaped mirror is capable of orthographically reflecting principal rays from an entire hemisphere. Advantageously, therefore, the WAIS 10 using the paraboloid-shaped mirror 120 is able to provide a hemispherical field of view from a single viewpoint (i.e., from the focus of the paraboloid). Moreover, since the WAIS 10 has a single viewpoint, its images can be mapped to perspective and panoramic views without any distortion.

Figure 9:
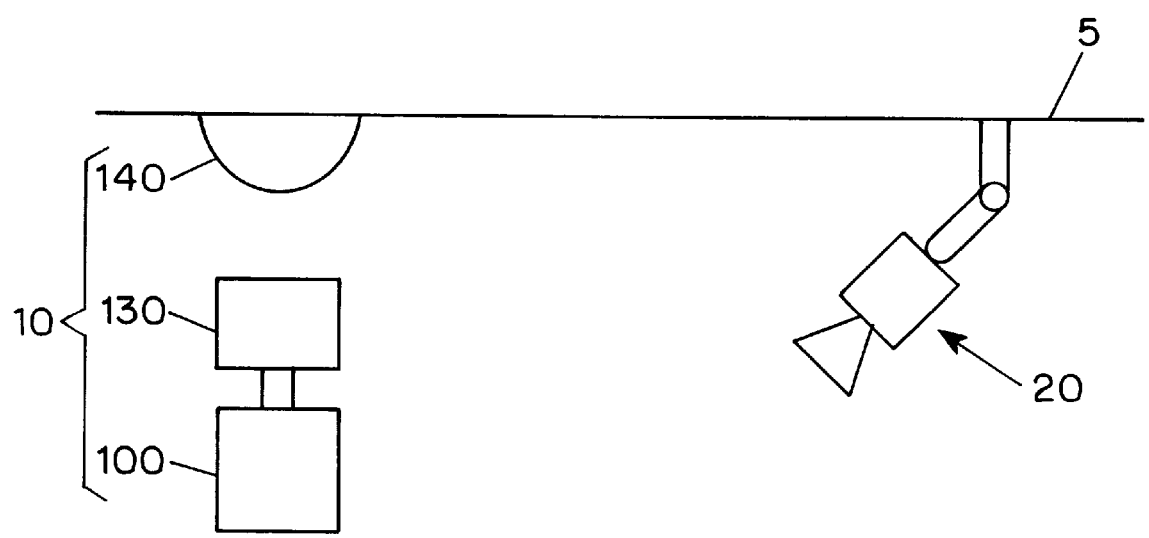
FIG. 9 is a side view of a video surveillance and monitoring system according to another preferred embodiment of the present invention, in which the wide-angle imaging system includes a catadioptric system with a hyperboloidal-shaped mirror.

Alternatively, other catadioptric imaging systems may be used in the present invention. As used in this specification and the appended claims, the term "catadioptric" refers to an imaging system that uses a combination of reflecting surfaces (such as mirrors) and refracting surfaces (such as lenses). Examples of other catadioptric imaging systems that may be used as the wide-angle imaging system of the present invention include, as shown in FIG. 9, a hyperboloidal or ellipsoidal mirror 140 used in conjunction with a perspective lens 130. Examples of hyperboloidal and ellipsoidal mirrors are disclosed in Yamazawa et al. and Rees, which have been discussed earlier. Hyperboloidal and ellipsoidal systems may also be configured to provide a single viewpoint and, thus, as with paraboloidal systems, the images produced by such systems may be mapped to perspective or panoramic views without distortion. Nonetheless, these systems are less favored than paraboloidal systems because they require complex calibration and implementation.

Additionally, although it is less desirable, catadioptric systems containing other curved surfaces that do not provide images from a single viewpoint, such as spherical or conical surfaces, may also be used for the wide-angle imaging system of the present invention. Although they do not provide images with a single viewpoint, such systems are capable of serving the main purpose of the wide-angle imaging system of the present invention - - - i.e., to detect regions of interest (and not necessarily to provide distortion-free visual details of those regions). Thus, although it may be desirable, it is not critical to provide images with a single viewpoint from the wide-angle imaging system of the present invention.

Figure 10A:
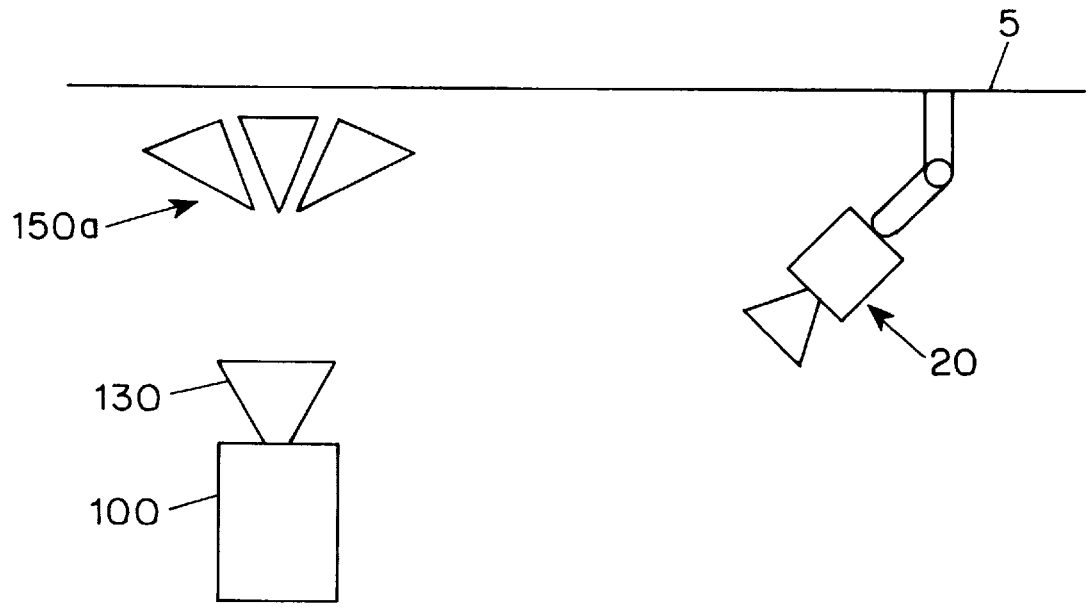
FIG. 10A is a side view of a video surveillance and monitoring system according to another preferred embodiment of the present invention, in which the wide-angle imaging system includes a catadioptric system with a plurality of planar mirrors arranged in a pyramid shape.
Figure 10B:
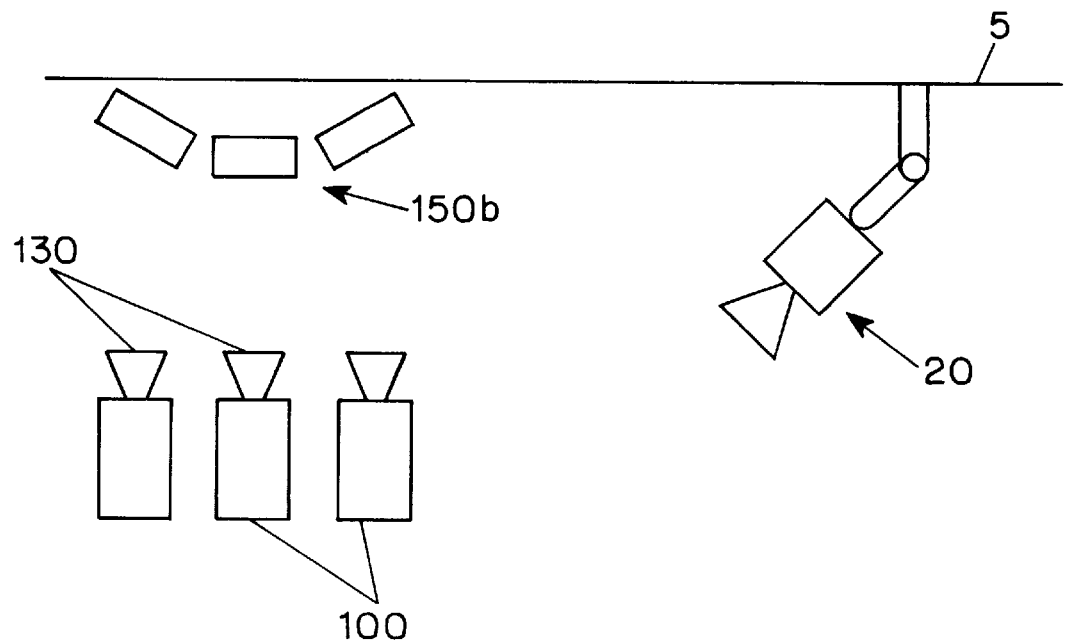
FIG. 10B is a side view of a video surveillance and monitoring system according to another preferred embodiment of the present invention, in which the wide-angle imaging system includes a catadioptric system with a plurality of planar mirrors arranged in a polyhedral-shape.

In addition to curved surfaces, various arrangements of planar mirrors may be used for the wide-angle imaging system of the present invention. For example, in FIG. 10A, triangular planar mirrors 150*a* are arranged in a pyramid shape to reflect a wide-angle field of view to a single camera 100. As another example of a catadioptric system with planar mirrors, in FIG. 10B, polygonal planar mirrors 150*b* are arranged in a polyhedral shape to reflect a wide-angle field of view to multiple cameras 100. A specific example of this embodiment is disclosed in U.S. Pat. No. 5,539,483 to Nalwa, which was discussed earlier.

Figure 11:
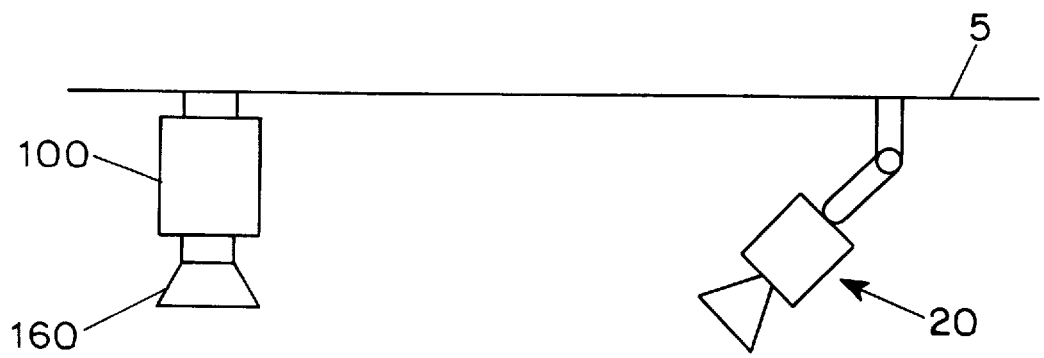
FIG. 11 is a side view of a video surveillance and monitoring system according to another preferred embodiment of the present invention, in which the wide-angle imaging system includes a wide-angle lens.
Figure 12:
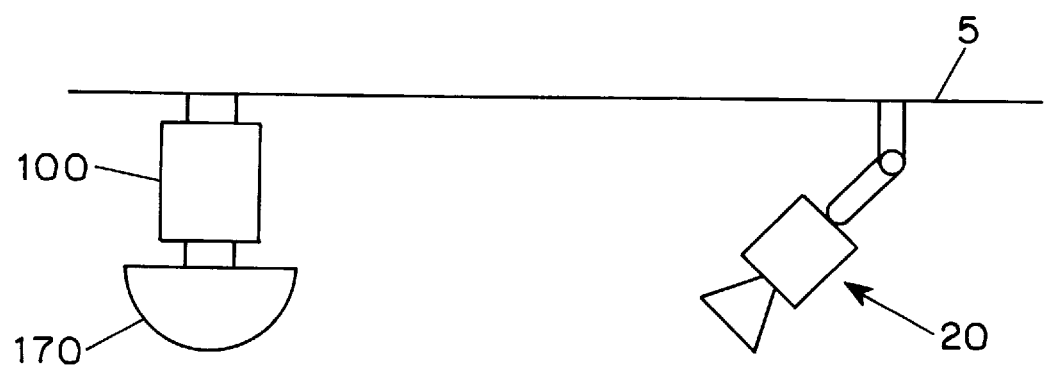
FIG. 12 is a side view of a video surveillance and monitoring system according to another preferred embodiment of the present invention, in which the wide-angle imaging system includes a fish-eye lens.

Instead of a catadioptric system, commercial wide-angle lenses may also be used for the wide-angle imaging system of the present invention. For example, as shown in FIG. 11, a wide-angle lens 160, such as a 2 mm focal-length COMPUTAR EMH200, could be mounted on a camera 100 on a ceiling 5 to provide a 115° view of the area beneath it. Alternatively, if a wider field of view is necessary, a fish-eye lens 170, as illustrated in FIG. 12, such as a NIKON 8 mm focal-length F2.8 lens, could be used to provide a substantially hemispherical field of view.

Figure 15A:
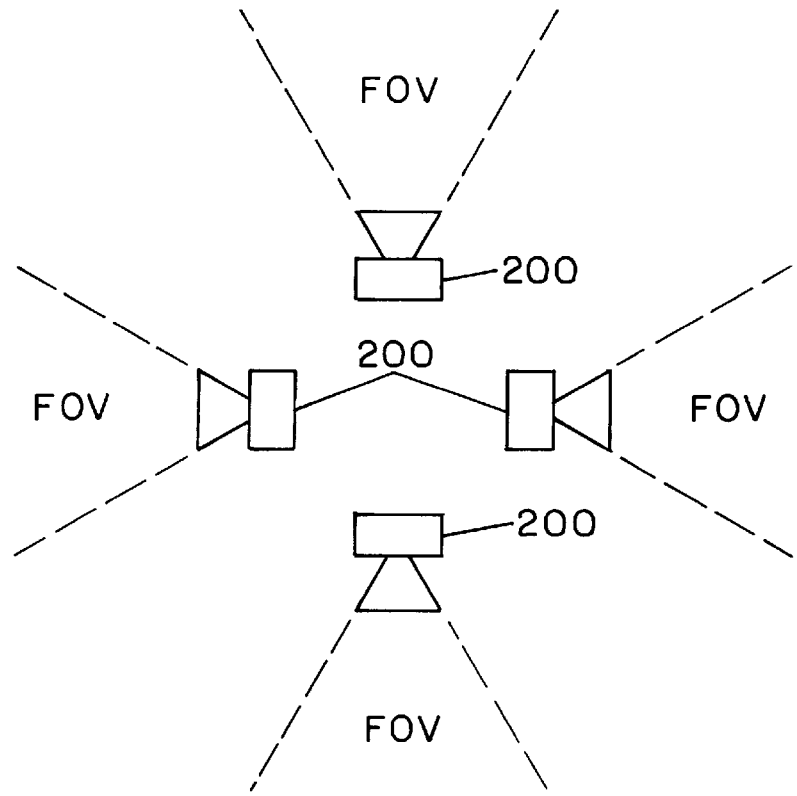
FIGS. 15A and 15B are top plan views of video surveillance and monitoring systems according to preferred embodiments of the present invention, in which the wide-angle imaging system includes a plurality of camera systems.
Figure 15B:
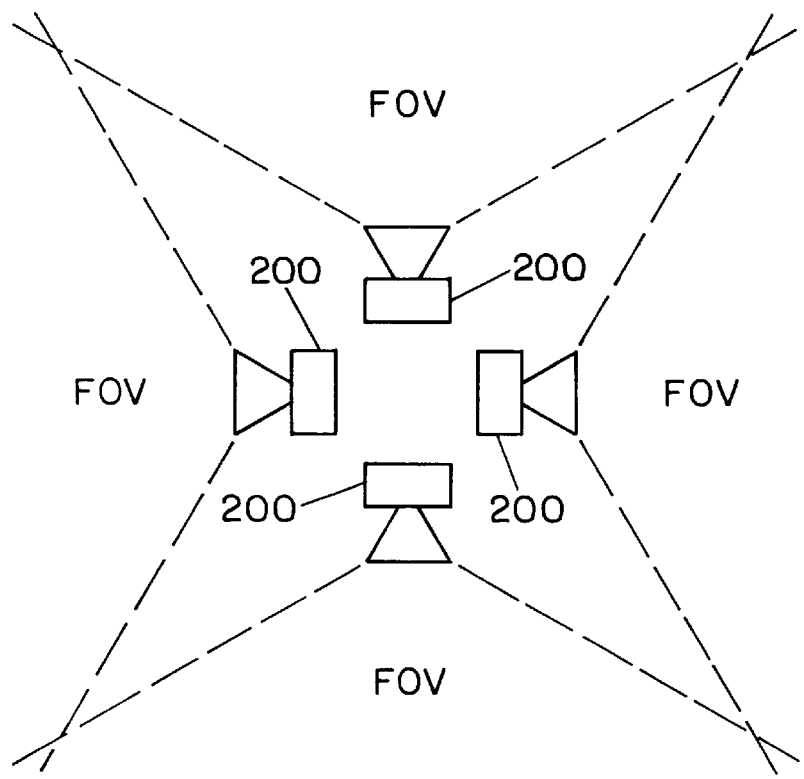

In addition, as shown in FIGS. 15A and 15B, the wide-angle imaging system of the present invention may comprise multiple camera systems 200. The camera systems 200 may contain non-overlapping fields of view as in FIG. 15A, or they may contain overlapping fields of view as in FIG. 15B. In addition, each camera system 200 may be either a narrow-angle or wide-angle camera system.

Although the present invention has been described with reference to certain preferred embodiments, various modifications, alterations, and substitutions will be known or obvious to those skilled in the art without departing from the spirit and scope of the invention, as defined by the appended claims.

We claim:

1. The surveillance and monitoring system for monitoring an area, comprising:
    (a) a first imaging system having a wide-angle field of view approximately equal to or greater than said area, said first imaging system providing a direction information for at least one portion of said area;
    (b) one or more second imaging systems having adjustable view settings and receiving said direction information from said first imaging system, said one or more second imaging systems positioned to view said at least one portion of said area and being capable of producing images of said at least one portion using said direction information and predetermined depth information relating a depth of said at least one portion of said area at a fixed height from a predetermined base level; and
    (c) one or more controls for controlling said adjustable view settings of said one or more imaging systems.

2. The surveillance and monitoring system of claim 1, wherein said area is substantially hemispherical and said first imaging system has a substantially hemispherical field of view.

3. The surveillance and monitoring system of claim 1, wherein said adjustable view settings include a pan setting for adjusting the pan angle of said one or more second imaging systems with respect to said area.

4. The surveillance and monitoring system of claim 1, wherein said adjustable view settings include a tilt setting for adjusting the tilt angle of said one or more second imaging systems with respect to said area.

5. The surveillance and monitoring system of claim 1, wherein said adjustable view settings include zoom settings for adjusting the zoom of said one or more second imaging systems with respect to said portions of said area.

6. The surveillance and monitoring system of claim 1, wherein said first imaging system is a catadioptric system comprising a reflecting surface positioned to reflect an image of said area and one or more image sensors optically coupled to said reflecting surface.

7. The surveillance and monitoring system of claim 6, wherein said reflecting surface comprises a truncated, substantially paraboloid-shaped mirror.

8. The surveillance and monitoring system of claim 6, wherein said reflecting surface comprises a truncated, substantially hyperboloidal-shaped mirror.

9. The surveillance and monitoring system of claim 6, wherein said reflecting surface comprises a substantially ellipsoidal-shaped mirror.

10. The surveillance and monitoring system of claim 6, wherein said reflecting surface comprises one or more curved mirrors.

11. The surveillance and monitoring system of claim 6, wherein said reflecting surface comprises one or more planar mirrors.

12. The surveillance and monitoring system of claim 1, wherein said first imaging system comprises imaging optics and one or more image sensors optically coupled to said imaging optics.

13. The surveillance and monitoring system of claim 12, wherein said imaging optics comprises a wide-angle lens.

14. The surveillance and monitoring system of claim 12, wherein said imaging optics comprises a fish-eye lens.

15. The surveillance and monitoring system of claim 1, wherein said first imaging system comprises a plurality of camera systems.

16. The surveillance and monitoring system of claim 1, further comprising a monitoring station including:

one or more displays, at least one display coupled to said first imaging system for displaying an image of said area and at least one display coupled to said one or more second imaging systems; and an input arrangement selecting a region of interest displayed on said at least one display coupled to said first imaging system, said input arrangement operatively coupled to said one or more controls for controlling said adjustable view settings such that at least one of said one or more second imaging systems is positioned to view said region of interest.

17. The surveillance and monitoring system of claim 1, wherein said first imaging system provides an image signal representative of said area, and further comprising an image signal processing apparatus coupled to said first imaging system to convert said image signal into image signal data.

18. The surveillance and monitoring system of claim 17, wherein said image signal processing apparatus includes an arrangement which maps said image signal data into a Cartesian-coordinate system to produce a perspective image.

19. The surveillance and monitoring system of claim 17, wherein said image signal processing apparatus includes an arrangement which maps said image signal data into a cylindrical-coordinate system to produce a panoramic image.

20. The surveillance and monitoring system of claim 1, further comprising a motion detection arrangement coupled to said first imaging system which detects objects in motion in said area.

21. The surveillance and monitoring system of claim 20, further comprising a tracking arrangement which tracks one or more of said objects in motion in said area, said tracking arrangement having an input coupled to said motion detection arrangement and an output coupled to said one or more controls for controlling said adjustable view settings.

22. A surveillance and monitoring system for monitoring an area, comprising:

(a) a first imaging system having a wide-angle field of view approximately equal to or greater than said area;

(b) a motion detection arrangement coupled to said first imaging system which detects objects in motion in said at least one portion;

(c) a tracking arrangement coupled to said motion detection arrangement which tracks at least one of said detected objects in motion and generates direction information relating to said at least one of said detected objects; and (d) at least one second imaging system receiving said direction information and being capable of producing images of said at least one of said detected objects using said direction information and predetermined depth information relating a depth of said at least one of said detected objects at a fixed height from a predetermined base level.

23. A method for monitoring an area, comprising the steps of:

(a) sensing a global image of said area with a first imaging system having a field of view approximately equal to or greater than said area;

(b) detecting a region of interest within said global image;

(c) sensing one or more detailed images of said region of interest with at least one second imaging system;

(d) providing, from said first imaging system, direction information for said region of interest; and (e) producing, with at least one second imaging system, said one or more images of said region of interest using said direction information and predetermined depth information relating a depth of said at region of interest at a fixed height from a predetermined base level.

24. A method for monitoring an area, comprising the steps of:

(a) positioning a first imaging system to view said area, said first imaging system having a wide-angle field of view approximately equal to or greater than said area;

(b) positioning one or more second imaging systems having adjustable view settings to view at least one portion of said area, each of said one or more second imaging systems being capable of producing images of said at least one portion with a resolution greater than said first imaging system;

(c) sensing an image of said area with said first imaging system;

(d) detecting a region of interest within said sensed image;

(e) generating, from said first imaging system, direction information for said detected region;

(f) producing, with said one or more second imaging systems, said image using said direction information and predetermined depth information relating a depth of said at least one portion of said area at a fixed height from a predetermined base level; and (g) controlling said adjustable view settings so as to view said region of interest with at least one of said one or more second imaging systems.

25. A method for monitoring one or more objects in motion in an area, comprising the steps of:

(a) positioning a first imaging system to view said area, said first imaging system having a wide-angle field of view approximately equal to or greater than said area;

(b) positioning one or more second imaging systems having adjustable view settings to view at least one portion of said area, each of said one or more second imaging systems being capable of producing images of said at least one portion with a resolution greater than said first imaging system;

(c) sensing images of said area with said first imaging system;

(d) detecting said one or more objects in motion from said sensed images;

(e) tracking one or more of said detected objects;

(f) generating, from said first imaging system, direction information for said one or more detected objects;

(g) producing, with said one or more second imaging systems, said image using said direction information and predetermined depth information relating a depth of said at least one portion of said area at a fixed height from a predetermined base level; and (h) controlling said adjustable view settings so as to view said tracked objects with at least one of said one or more second imaging systems.

26. The method for monitoring one or more objects in motion in an area of claim 25, wherein said step of detecting comprises:

generating a series of image frames at predetermined time intervals from said sensed images;

filtering said series of image frames for noise;

calculating a moving average frame from a subset of said series of image frames comprising the set from the first image frame to the next-to-last image frame;

subtracting the filtered, last image frame of said series of image frames from said moving average frame to produce a difference image frame;

comparing each pixel of said difference image frame to a predetermined threshold value to produce a threshold image frame indicative of regions of motion in said area;

defining a first group of objects associated with said subset of said series of image frames;

associating a second group of objects with said regions of motion in said threshold image frame; and generating a third group of objects comprising all unique objects in said first and second groups.

27. The method for monitoring one or more objects in motion in an area of claim 26, wherein the step of tracking comprises:

selecting a fourth group of objects to be tracked from said third group of objects on the basis of a predetermined criteria;

determining a focus point for each object in said fourth group of objects; and applying a smoothing function to the focus point of each object.

28. The method for monitoring one or more objects in motion in an area of claim 25, wherein said step of controlling comprises mapping the coordinates of said tracked objects from the coordinate system of said first imaging system into the coordinate system of at least one of said one or more second imaging systems.

* * * * *

UNITED STATES PATENT AND TRADEMARK OFFICE
CERTIFICATE OF CORRECTION

PATENT NO. : 6,215,519 B1
DATED : April 10, 2001
INVENTOR(S) : Nayar et al.

It is certified that error appears in the above-identified patent and that said Letters Patent is hereby corrected as shown below:

Title page,
Item [56], References Cited, U.S. PATENT DOCUMENTS,
insert -- 5,760,876  6/1998  Nayar ................348/36 --;

OTHER PUBLICATIONS,
Under "Primary Image-etc.," (fourth occurrence), "thml," should read -- html, --;
Under "Primary Image-etc.," (sixth occurrence), "Zome" should read -- Zone --;
Under S. Bogner et al., "Defence" should read -- Defense --
Under E. Hall et al., "Illimination" should read -- Illumination --
Under V. Nalva, "Nalva" should read -- Nalwa --
Under S.E. Chen, "Envbironment" should read -- Environment --
Under K. Yamazawa et al., "Internation" should read -- International --

Column 1,
Line 4, insert -- The U.S. Government has certain rights in this invention pursuant to the terms of DARPA Contract No. N00014-97-1-0553 and National Science Foundation Grant No. IRI-93-57594. --
Line 45, "---" should read -- – --

Column 6,
Line 65, "includes" should read -- include --

Column 9,
Line 16, "$d_{poy}=d_{woy}-d_{wpy}$" (line 16 in its entirety) should be deleted Column 10,
Line 21, "MHZ" should read -- MHz --
Line 60, "$I_t$are" should read -- $I_t$ are --

Column 11,
Line 42, "$D_t$is" should read -- $D_t$ is --

UNITED STATES PATENT AND TRADEMARK OFFICE
CERTIFICATE OF CORRECTION

PATENT NO. : 6,215,519 B1
DATED : April 10, 2001
INVENTOR(S) : Nayar et al.

It is certified that error appears in the above-identified patent and that said Letters Patent is hereby corrected as shown below:

Column 13,
Line 1, "1996," should read -- 1996 --; and "1998)" shoud read -- 1998), --
Line 5, "1997, (currently pending)" should read -- 1997 (currently pending), --
Line 49, "---" should read -- – --

Column 14,
Line 22, "The" should read -- A --

Column 15,
Line 12, "comprises" should read -- comprise --
Line 14, "comprises" should read -- comprise --

Column 16,
Line 22, "at" should be deleted

Column 18,
Line 11, "a" should be deleted

Signed and Sealed this

Twenty-sixth Day of March, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,215,519 B1 Page 1 of 1
APPLICATION NO. : 09/034745
DATED : April 10, 2001
INVENTOR(S) : Nayar et al.

It is certified that error appears in the above-identified patent and that said Letters Patent is hereby corrected as shown below:

IN THE SPECIFICATION:
On Page 1, Column 1, line 4, please insert the following header and paragraph:

-- Statement Regarding Federally Sponsored Research or Development
This invention was made with government support under grant number 9357594 awarded by the National Science Foundation and grant number N00014-97-1-0553 awarded by the Office of Naval Research. The government has certain rights in the invention. --

Signed and Sealed this

Third Day of June, 2008

JON W. DUDAS
*Director of the United States Patent and Trademark Office*